United States Patent [19]
Hirst et al.

[11] Patent Number: 5,930,553
[45] Date of Patent: Jul. 27, 1999

[54] IMAGE FORMING AND OFFICE AUTOMATION DEVICE CONSUMABLE WITH MEMORY

[75] Inventors: B. Mark Hirst; K. Trent Christensen; Andrew J. Binder, all of Boise, Id.

[73] Assignee: Hewlett-Packard Company, Palo Alto, Calif.

[21] Appl. No.: 08/845,800

[22] Filed: Apr. 25, 1997

[51] Int. Cl.⁶ ............................................. G03G 15/00
[52] U.S. Cl. ................................. 399/8; 399/12; 399/24; 399/77
[58] Field of Search ............................ 399/8, 12, 24, 399/25, 26, 78; 395/114; 340/540; 347/900, 86

[56] References Cited

U.S. PATENT DOCUMENTS

| | | | |
|---|---|---|---|
| 4,961,088 | 10/1990 | Gilliland et al. | 399/25 |
| 5,272,503 | 12/1993 | LeSueur et al. | 399/25 |
| 5,283,613 | 2/1994 | Midgley, Sr. | 399/9 |
| 5,471,564 | 11/1995 | Dennis et al. | 395/114 |
| 5,491,540 | 2/1996 | Hirst | 399/12 |
| 5,682,140 | 10/1997 | Christensen et al. | 340/540 |

*Primary Examiner*—Joan Pendegrass

[57] ABSTRACT

A consumable having a memory device for storing information such as usage information to be used by a the original manufacturer or re-manufacturer. The memory device can also be used to provided software updates or patches for the microcomputers within an image forming or other office automation device.

10 Claims, 6 Drawing Sheets

Functions In Host Driver

| 1. Receive Request For Date From Image Forming Device |
| --- |
| Extract Date From Host Device |
| Send Date To Image Forming Device |

| 2. Receive Request For User Prompt From Image Forming Device |
| --- |
| Prompt User That Update Is Available And Provide Instructions |

| 3. Extract Data From Consumable Memory |
| --- |

| 4. Write Data To Consumable Memory |
| --- |

| 5. Send And Receive Consumable Memory Updates To Engine Or Consumable Memory |
| --- |

Fig. 6

IMAGE FORMING AND OFFICE AUTOMATION DEVICE CONSUMABLE WITH MEMORY

BACKGROUND OF THE INVENTION

1. Technical Field

This invention generally relates to image forming and office automation devices and more particularly to a consumable for use in these devices which includes a memory for storing information about installation and exhaustion dates and consumable consumption and for updating programming within the devices.

2. Background Art

Most image forming devices, such as facsimile machines, printers and copiers, utilize any number of consumables, e.g. toner, ink, ribbon, photoconductor, developer, etc., which need to be replaced at the end of their lives. The service life for a consumable is generally designed by the manufacturer and is monitored by the print engine in which it operates. Optimally, near the end of the consumable's life, the print engine displays a message to the user on the front panel of the device or on a host device, such as a personal computer, concerning the status of the consumable.

Because of the way in which the consumables are marketed, it is very difficult for the manufacturer to gather information directly from the operators of the consumable products concerning consumable consumption rates and use. More often than not, the consumable products are retailed through large distributors and returned directly to the manufacturer or re-manufacturer for recycling upon exhaustion without a return address. The result has been that manufacturers have had to gather information about product usage indirectly. For example, trying to track manufacturing dates and lot numbers to gather general usage information. However, this method is only suitable for identifying general trends since it is very difficult, if not impossible, to guess installation and exhaustion dates due to varying shelf times and the wide geographic region of product distribution.

As a consequence, manufacturers have attempted to get information directly from the consumer by including product survey cards with the new consumable products. Unfortunately, the participation rates for these kinds of surveys are quite low in comparison to the total number of products sold. Historically, participation rates have been as low as 2%. It is very easy for the consumer to discard the survey card when the new consumable is installed.

Examples of the types of consumable devices in a laser printer are: the toner cartridge(s); the photoconductor, typically a drum or belt; developer assemblies; the silicon pads on the fuser rollers; fuser assemblies; cleaning rollers; oiling rollers; transfer assemblies and even transfer belts and gear trains. Other consumables for other devices include such things as ribbons, ink cartridges; ink bladders; and ink print heads.

Additionally, it is oftentimes desirable to provide updates to the programming of office automation and image forming devices to provide additional features, adjust operating parameters and fix software bugs. For instance, in one color laser printer currently on the market there are at least four separate microcomputers within the device. There is one microcomputer in the user display to gather data from the user and present visual display of important data to the user, there is a microcomputer in the print engine to control the xerographic image development process, there is a microcomputer which takes a desired printed page and rasterizes the image for transfer to the laser imaging device within the print engine, and finally there is another microcomputer to control access to and data interchange with a local area network or LAN. Likewise, with other image forming devices and office automation devices it may prove necessary to update the computer software/firmware for any of the microcomputers that reside within the office automation equipment. Currently, however, this is both difficult and expensive to accomplish since it is necessary to physically change out the memory device, typically a ROM (read only memory) of some sort. Most often, this must be accomplished by a service technician or an expensive factory recall. Presently, the communication between a host device and a printer is primarily "one way" in the sense that most of the information is sent from the host to the printer to be printed. A very limited amount of information, specifically a paper supply tray status bit and a toner cartridge low status bit, is sent from the printer to the host device.

Accordingly, it would be advantageous to provide more direct communication with the manufacturers of the consumable components regarding the consumption rates, installation and exhaustion dates and other key information. Additionally, it would be advantageous to be able to provide software patches and updates to the office automation and image forming devices. Also, it would be advantageous to provide a robust two way communications link between a host device and image forming and office automation devices.

SUMMARY OF THE INVENTION

This invention employs a memory device located on or within the consumable and can use software in either or both the image forming or office automation device and/or software in a host computer connected to the image forming or office automation device, for example in the print driver software. A communication channel interface is provided which allows the memory device to receive and store data from a host device such as a personal computer. Additionally, the communication channel can include a data path to the various program storage elements for the microcontrollers within the image forming or office automation device which the consumable serves. This data path allows the memory device to provide software updates or patches for the software programs for the microcontrollers. This allows device features to be added and altered and software bugs to be fixed without direct user intervention. A specific example, is an update to the color lookup tables which control generation of specific color shades. As toner formulations are optimized it is sometimes necessary to alter some or all of the electrographic printing parameters to take advantage of the new toner formulation. Until now, there has been no convenient way to do this to an image forming device already in service.

The memory device is a nonvolatile memory device such as a 256 bit EEPROM, part number DS2430, a three wire serial memory device made by Dallas Semiconductor, a 1 kbit EPROM, part number DS1991, which is a one wire serial memory device made by Dallas Semiconductor, a 93-CS46 two wire serial EEPROM manufactured by National Semiconductor, a 4 kbit serial FRAM (ferro-ram), part number FM24C04, manufactured by Ramtron or a similar device. A simple and reliable electrical connection is provided between the consumable electronics and the image forming device which doesn't require any user intervention.

By modifying the software in the host device, such as the printer driver in a host computer, the driver can be made to recognize a request for information from the image forming or office automation device. The driver then extracts the desired information from the host device and forwards this information to the memory device for storage. Likewise, the control software in the image forming and office automation devices can be modified to both generate these requests and to recognize a request from the host device for information about the various consumables or query for information stored in the consumables' memories. Additional modifications may be necessary to the communication protocols to accommodate the requests. In the case of an image forming device, it is convenient to provide support for the requests in either the POSTSCRIPT (POSTCRIPT is a trademark of Adobe) printer language or the PCL (PCL is a trademark of Hewlett-Packard) printer language.

For example, using the bidirectional Centronics printer connection, the printer driver software or even application software can generate one or more pieces of information to be stored within the consumable memory which can then be accessed at a later time by the consumable re-manufacturer. This information can contain usage rate information, for example, which can be used to tailor future product development to better serve the end user. In addition to usage rate information, information such as the installation date, print densities of print jobs, host computer type, operating system, number of consumables consumed since purchase date, number of pages printed since last consumable, average consumable life, consumable manufacturing codes, warranty prorating information, user preference settings, etc. can be stored to help manufacturers gather key information more accurately and easily as well as providing a tightly coupled device/host package resulting in easier use by the consumer.

The software updating feature is triggered at the time of consumable replacement by detecting the installation of the consumable. This can be accomplished a number of different ways. One way is to simply compare a version number or manufacturing date for the new consumable with a previously stored version number or manufacturing date of the old consumable. If the newly installed consumable has a newer version number, an installation date is requested from the host device and stored in the consumable memory. Additionally if the new consumable memory contains a code patch, an updating routine in the programming of the image forming device is activated and the code patch is uploaded from the consumable memory into a programmable memory in the image forming device. The version number of the consumable memory device is also updated in the image forming device for future comparison with other newly installed consumables. The consumable memory and host device continue to interact throughout the life of the consumable to store user information, usage information and can even continue to modify the programming in the image forming device should conditions change.

DETAILED DESCRIPTION OF THE INVENTION

Figure 1:
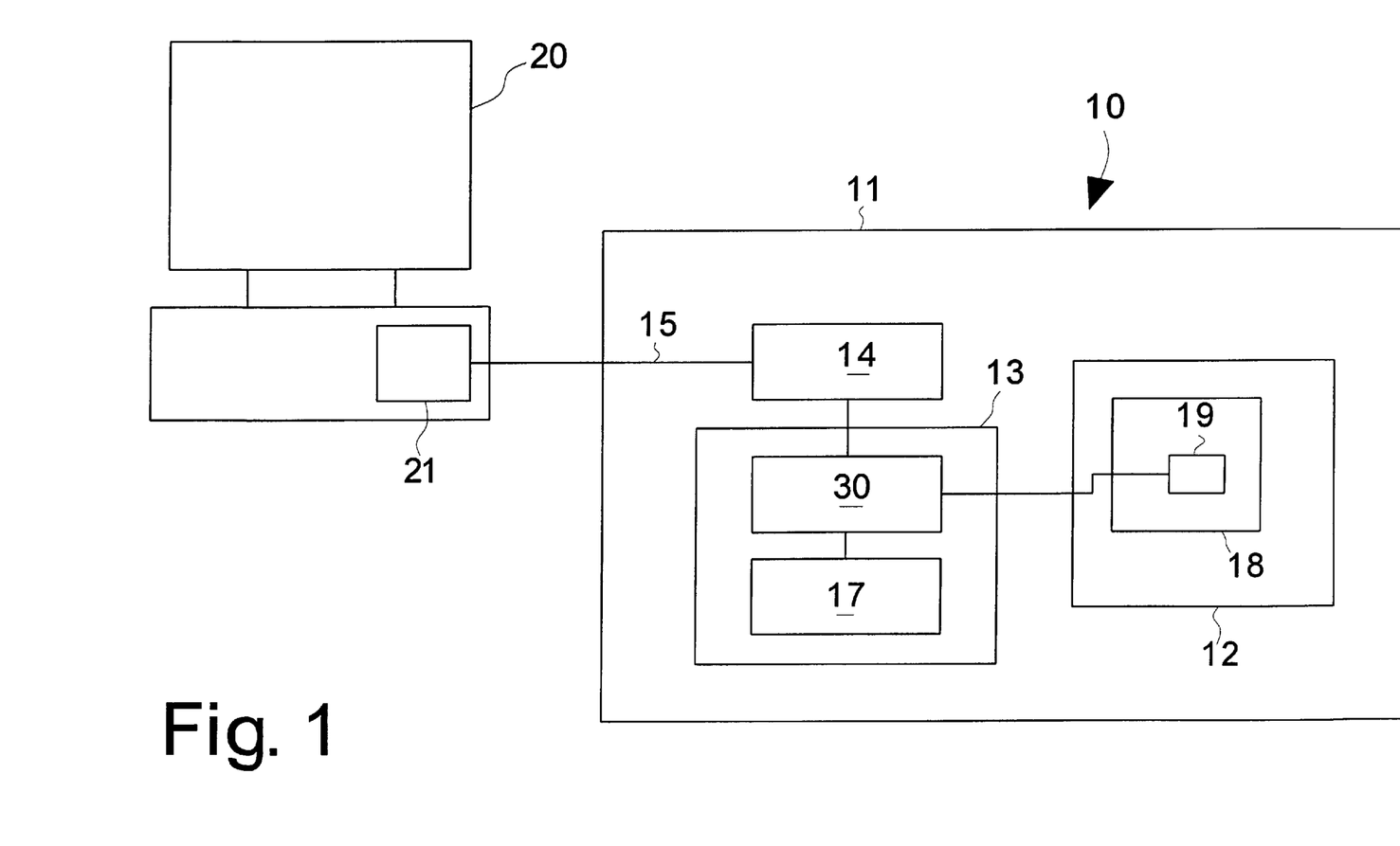
FIG. 1 is a schematic representation of an image forming device incorporating a consumable having a memory device therein.

Referring now to the figures, an image forming device 10 is shown in schematic representation in FIG. 1 connected to a host device 20 by a standard bidirectional communications printer cable. While this representation is indicative of a laser type printer it should be understood that the invention is not so limited and is applicable to other image forming devices and office automation devices such as facsimile machines, thermal printers, impact printers, ink jet printers and virtually any other kind of device which uses expendable components to create the images. The laser printer example has been adopted for the sake of convenience and understanding only. Hence, any references to a laser printer, printing device or other specific printer references are intended to refer and apply to the broad categories of image forming devices and office automation devices which employ expendable components, broadly referred to as consumables.

Image forming device 10 includes a housing 11 to house its various electronic components. In general terms, those electronic components include a print engine 12, a printer controller 13, a formatter 14 and an input 15 for receiving data to be printed. In the case of a document printer such as a laser printer, print engine 12, which is the device that actually affixes the image to the print media, fixes or fuses one or more toner components to the print media to create the image. Printer controller 13 provides the supporting electronic control for the print engine and provides an interface to the print engine. In the case of a laser print engine, printer controller 13 generally modulates the laser for photoconductor exposure, sets the relative bias voltages and fuser temperatures, etc. Additionally, printer controller 13 usually monitors the status of the various consumable components within image forming device 10. By way of example, a toner level sensor within toner cartridge 18 will generate a toner low signal when the level of toner within toner cartridge 18 falls below a specific level. This signal is interpreted by print controller 13 and the appropriate action taken.

The first embodiment of the invention has a simple storage element or memory device 19, such as an EEPROM, affixed to or within the housing of a consumable device such as toner cartridge 18 along with specially configured software or programming within printer controller 13. Other nonvolatile memory devices will also work such as a battery backed SRAM which advantageously allow both reading and writing the memory device. The programming within printer controller 13 detects both when a new consumable is installed and an end of life notification event for the consumable. The detection of these events can be triggered in many different ways. For instance, to detect when a new toner cartridge has been installed a single shot fuse can be employed which blows at the first use of the cartridge after installation. Alternatively, the removal and replacement of a consumable can trigger a comparison of a previously stored consumable identification number, i.e. stored outside of memory device 19 in the image forming computer or the engine control computer, with the identification number of the newly installed consumable. A difference in the identification numbers indicates that the consumables have changed and most likely a new consumable has been installed.

A second variation of the first embodiment has the programming or software residing in printer driver software 21 within host 20. In this embodiment, printer driver software 21 extracts the status of the consumable and updates the consumable status and date information in memory 19 with every print job.

Figure 2:
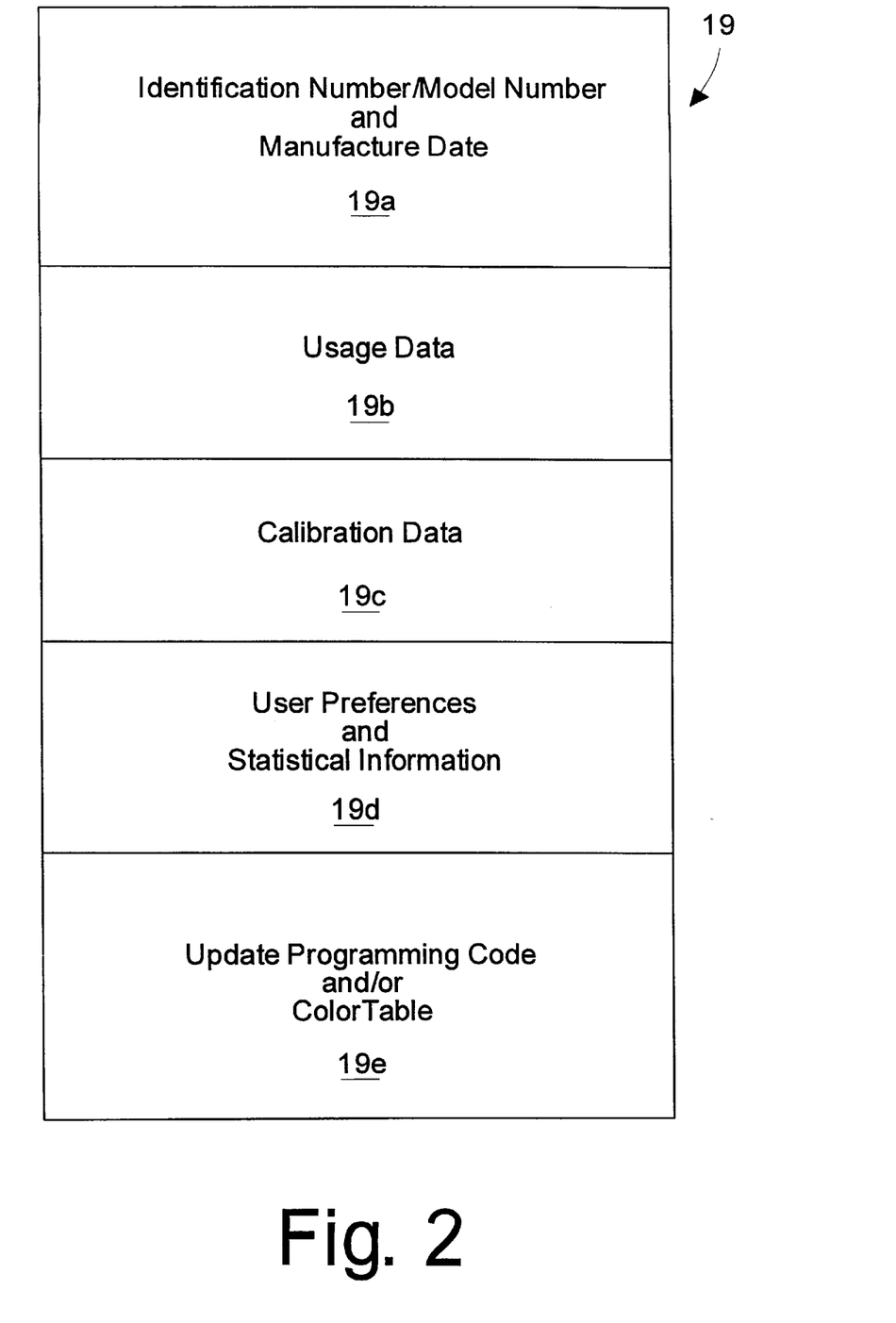
FIG. 2 is a diagram illustrating one possible consumable memory segmentation scheme for both the first and second embodiments of the invention.

FIG. 2 shows one possible memory segmentation scheme for memory device 19. Memory segment 19a provides storage space for the date of manufacture for the consumable. Memory segment 19b provides storage space for usage data such as the number of printed pages that the consumable has been in operation, amount of toner or ink remaining, etc. Memory segment 19c provides storage space for calibration data for use by the image forming device over the life of the consumable such as the toner to carrier ratio and sensor calibration data. Memory segment 19d provides space for storing other information such as usage information, paper types, requested print densities or any other data pertinent to the printing process. Memory segment 19e provides storage space for software and/or firmware patches to update the software in the image forming device and may include new lookup tables such as the color lookup tables. This feature forms the basis for the second embodiment of the invention.

Figure 3:
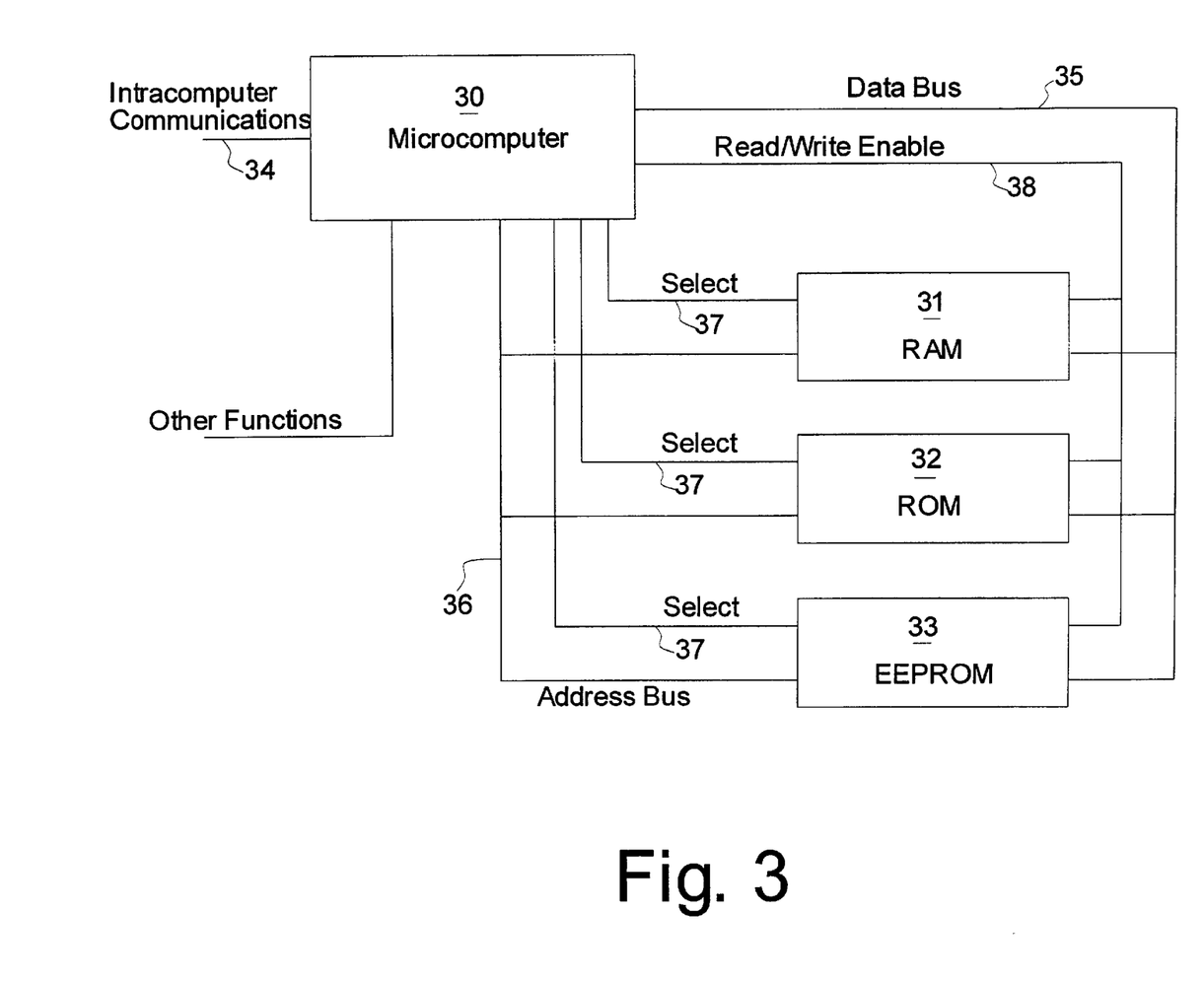
FIG. 3 is a block diagram schematic representation of a microcomputer arrangement capable of being updated via a code patch stored in the consumable memory device.

In most image forming devices there are a number of microcomputers 30 each controlling a different function with the image forming device. For example, there may be a separate microcomputer in the user display to gather data from the user and present visual display of important data to the user; a separate microcomputer in the print engine to control the xerographic image development process; a separate microcomputer which takes a desired printed page and rasterizes the image for transfer to the imaging device within the print engine; and a separate microcomputer to control access to and data interchange with host device or a local area network.

FIG. 3 illustrates a typical arrangement for one of the controlling microcomputers within an image forming device. A intracomputer communications bus 34 serves to connect two or more internal microcomputers. Each microcomputer may have several different kinds of memory devices dedicated for its use. Here, microcomputer 30 has a random access memory (RAM) device 31, a read only memory (ROM) device 32 and a electrically erasable programmable read only memory (EEPROM) device 33 connected in parallel, for the sake of illustration, by a data bus 35, address bus 36 and a read/write enable line 38. Separate select lines 37 are provided between microcomputer 30 and each of the memory devices. Normally, factory instructions for microcomputer 30 are programmed into ROM 32 at the time of manufacture which implement the functionality for a particular microcomputer 30.

However, should it become necessary or desirable to update the instructions for a microcomputer 30, a software patch stored in memory segment 19e of consumable memory device 19 can be uploaded into EEPROM 33. A flag bit, an instruction address lookup table or another similar scheme in EEPROM 33 can is used by microcontroller 30 to indicate that alternative instructions are available in EEPROM 33 rather than the original instructions in ROM 32. In this manner, whole new features can be introduced into an existing product by the user when they replace a used consumable with a new one having an updated consumable memory device 19.

A variation of the second embodiment uses a ROM device for consumable memory device 19, providing only the software patch function and eliminating the ability of the device to store usage data for reclamation at the time of recycling or re-manufacture.

In both the first and second embodiments of the invention, consumable memory device 19 and corresponding supporting software in controller 13, formatter 14, firmware 17, host device 20 and/or printer driver 21 provide a two way communication between a consumable and the host device enabling manufacturers to both collect data from a recycled consumable when it is returned to the factory and to provide updated printer control information to an existing product in use in the field without a service call.

Figure 4:
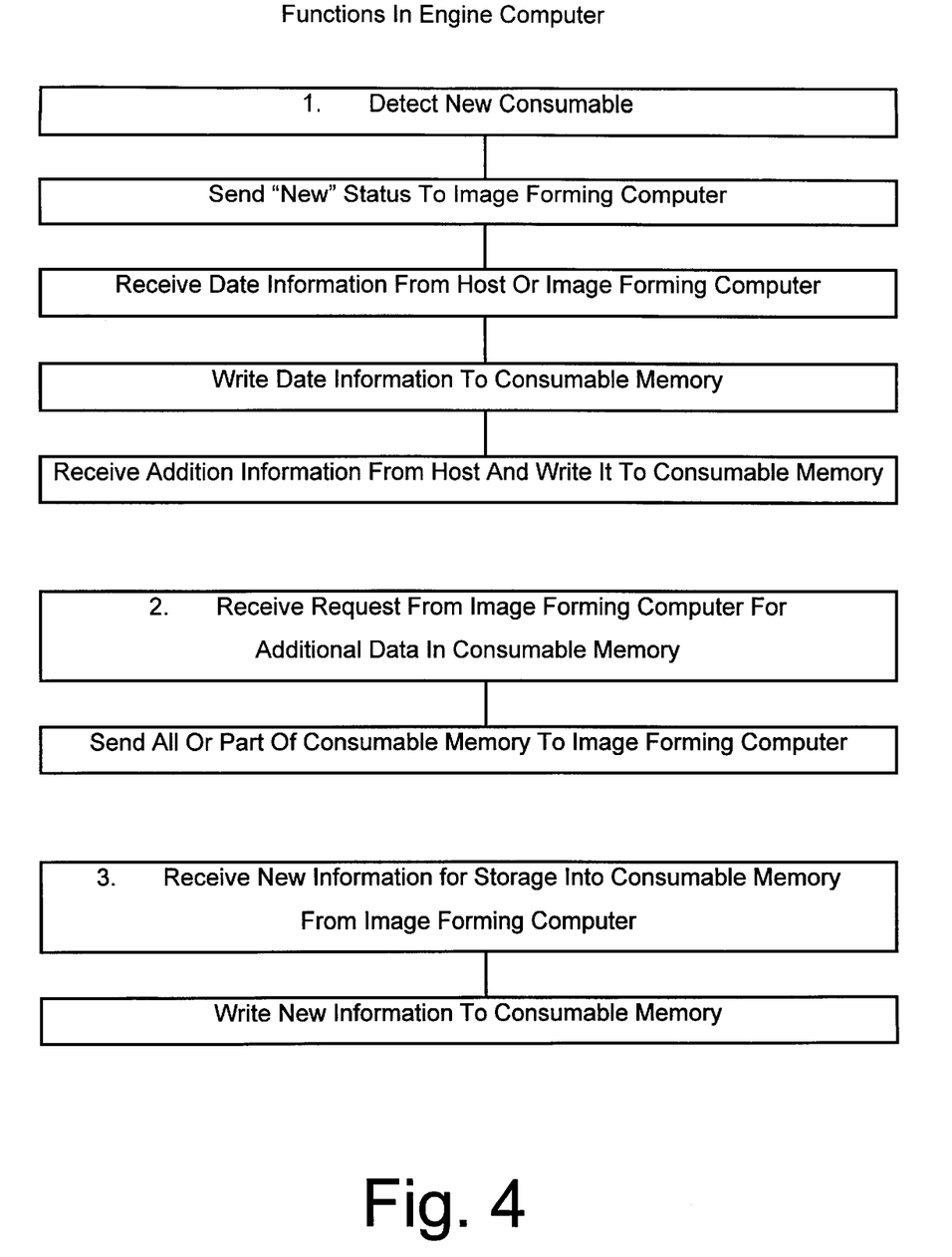
FIG. 4 is a flow diagram illustrating the software implementation of the invention in a print engine computer.
Figure 5:
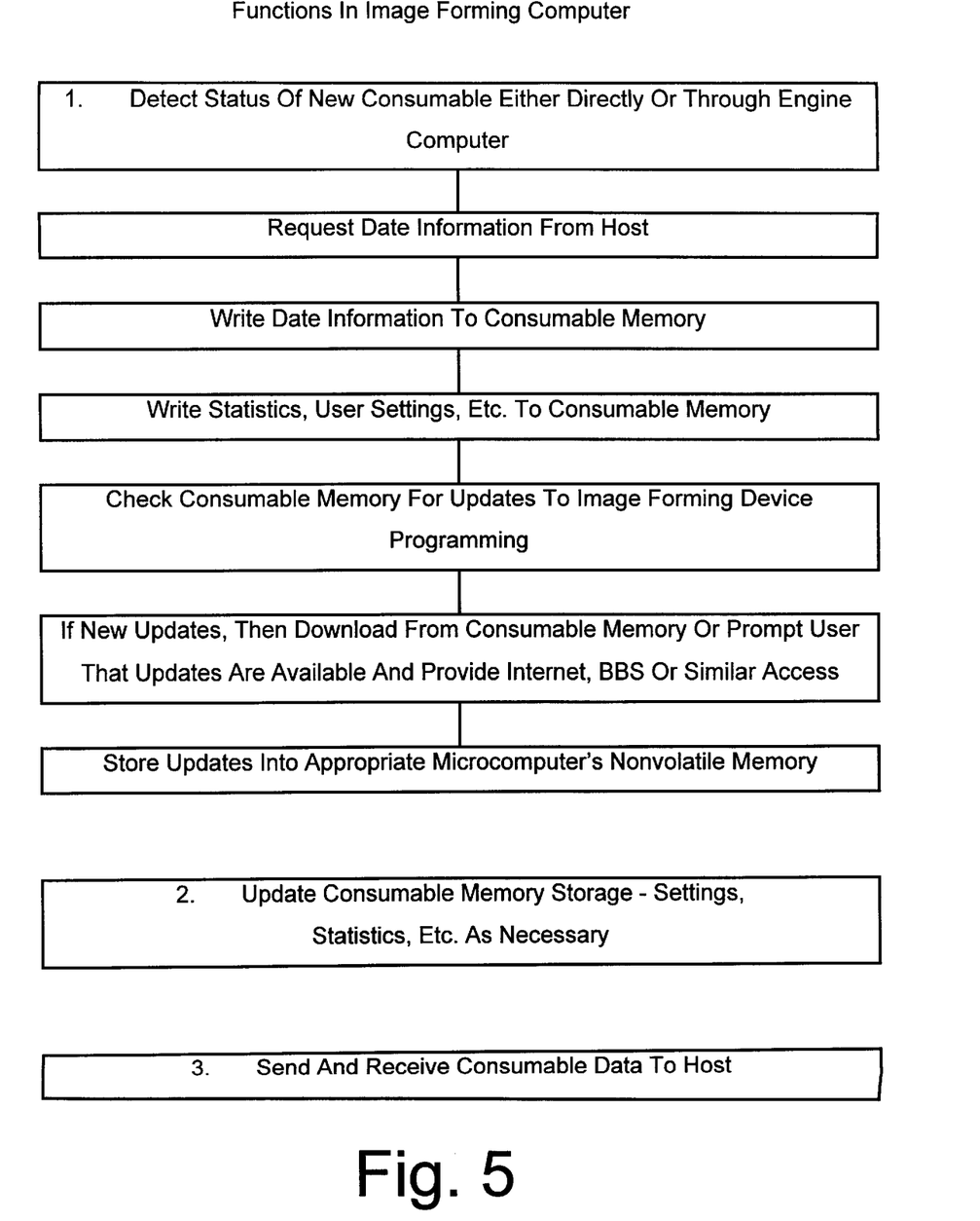
FIG. 5 is a flow diagram illustrating the software implementation of the invention in an image forming computer.
Figure 6:
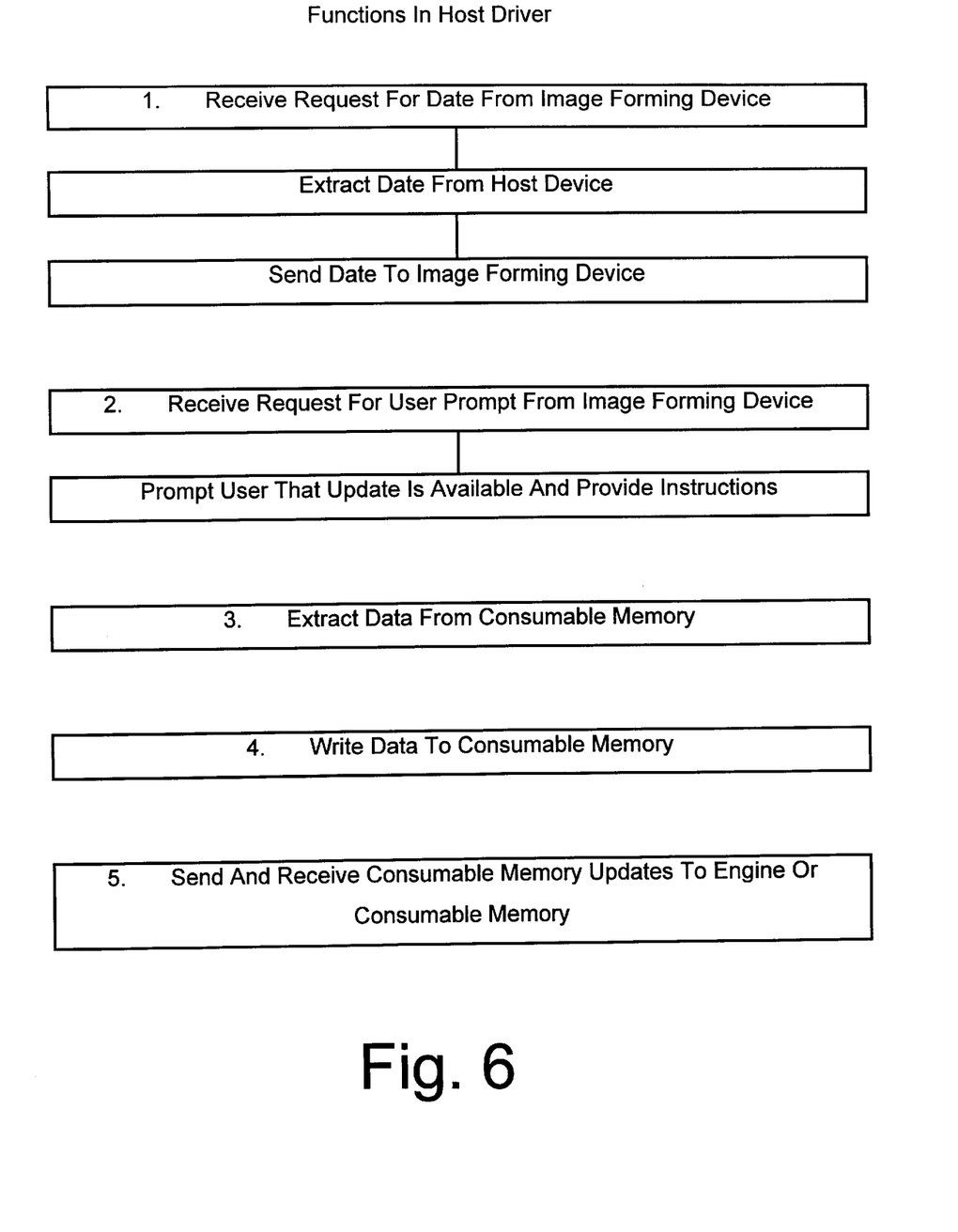
FIG. 6 is a flow diagram illustrating the software implementation of the invention in a print engine computer.

FIGS. 4-6 graphically illustrate one implimentation, with variations, of the software portion of the invention as it may be implemented in a print control computer (such as printer controller 13), an image processing computer (such as formatter 14) and a host device driver. Other modifications include providing an Internet or BBS link to provide an additional of bidirectional communication with an image forming device to transfer code patches, usage and statistical information as well as informing the user of new features.

While there is shown and described the preferred embodiment of the invention, it is to be distinctly understood that this invention is not limited thereto but may be variously embodied to practice within the scope of the following claims.

What is claimed is:

1. An image forming device which comprises:
   a housing;
   a print engine residing within the housing
   a printer controller electrically connected to the print engine;
   a consumable having a nonvolatile memory device in electronic communication with the printer controller; and
   a communication channel connected to the printer controller and operatively connectable to a host device to obtain information therefrom and to store received information in the memory device.

2. The image forming device of claim 1 wherein the printer controller is configured to detect insertion of a new consumable into the image forming device and store data from the host device in the nonvolatile memory device.

3. The image forming device of claim 1 wherein the printer controller is configured to detect insertion of a new consumable into the image forming device and store data from the host device in the nonvolatile memory device and is configured to detect the end of life of the consumable and store information in the nonvolatile memory device related to the end of the consumables life.

4. The image forming device of claim 3 wherein the nonvolatile memory device includes programming instructions to update the functionality of the image forming device.

5. The image forming device of claim 2 wherein the nonvolatile memory device includes programming instructions to update the functionality of the image forming device.

6. The image forming device of claim 1 wherein the nonvolatile memory device includes programming instructions to update the functionality of the image forming device.

7. A consumable for image forming devices which comprises:
   a consumable housing; and
   a nonvolatile memory device attached to the consumable housing and configured to communicate electronically with the image forming device and to store data received from a connected host device.

8. The consumable of claim 7 wherein the nonvolatile memory device includes programming instructions to update the functionality of the image forming device.

9. A toner cartridge for image forming devices which comprises:

a housing; and a memory device attached thereto configured to communicate electronically with the image forming device and to store data received from a connected host device.

10. The toner cartridge of claim 9 wherein the nonvolatile memory device includes programming instructions to update the functionality of the image forming device.

* * * * *